United States Patent [19]

Breen

[11] Patent Number: 4,861,159

[45] Date of Patent: Aug. 29, 1989

[54] DYNAMIC DOPPLER OPTICAL GAUGE

[75] Inventor: Michael T. Breen, Garden City, Mich.

[73] Assignee: Eaton Corporation, Cleveland, Ohio

[21] Appl. No.: 103,085

[22] Filed: Sep. 30, 1987

[51] Int. Cl.$^4$ ................................................. G01C 3/08
[52] U.S. Cl. ............................................ 356/5; 342/83; 342/84; 342/99; 342/132; 356/28.5
[58] Field of Search .................. 356/5, 28.5, ; 342/83, 342/84, 99, 132

[56] References Cited

U.S. PATENT DOCUMENTS 4,716,444 12/1987 Mongeon et al. .................... 356/5
4,743,110  5/1988 Arnaud et al. ....................... 356/5

Primary Examiner—Stephen C. Buczinski
Attorney, Agent, or Firm—C. H. Grace

[57] ABSTRACT

An optical gauge measures the shape of a target object by scanning a laser beam over it, (and/or measures the radial velocity of the target), by measuring the Doppler frequency shift of the reflected wave. The Doppler-shifted frequency is demodulated by a phase locked loop, which has a limited hold-in frequency range within which it is capable of staying locked on. With this invention, if the reflected wave's frequency gets close to exceeding the hold-in range of the phase locked loop, the gauge adjusts the drive frequency of an acoustooptical modulator that modulates the outbound target beam. This offsets the frequency of the target beam and keeps the return signal within the hold-in range of the phase locked loop.

2 Claims, 1 Drawing Sheet

DYNAMIC DOPPLER OPTICAL GAUGE

CROSS-REFERENCES TO RELATED APPLICATIONS

This application is one of a group of related applications that were filed simultaneously on Sept. 30, 1987, including Ser. Nos. 103,086, 103,087 which is now U.S. Pat. No. 4,818,100, Ser. No. 103,088 which is now U.S. Pat. No. 4,822,164, and Ser. No. 103,092.

FIELD

The invention relates to measurement by Doppler laser techniques of (a) the shape of a target that is being scanned, and/or (b) the rate of change of radial distance to a moving target.

PRIOR ART

Prior measurement systems that measured by means of the Doppler shift principle and employed a phase locked oscillator for tracking the shift, sometimes had an inconveniently limited range of Doppler shift over which the phase locked oscillator was able to stay in lock.

SUMMARY

An object of the invention is to provide a Doppler optical gauge employing a laser beam that propagates out to a target, reflects, and returns to the gauge, and in which an electronic signal processing circuit automatically changes the outgoing beam's frequency in steps to keep the return beam's frequency within the measuring range of a frequency discriminator circuit.

Another object is to provide a gauge in which the frequency of the outgoing beam is changed in preselected discrete steps by an acoustooptical modulator to offset at least partially the Doppler shift to which the beam will be subjected upon reflection, and in which the frequency of the return beam is tracked by a phase locked loop.

Another object is to provide a gauge in which an acoustooptical modulator is part of a step-variable closed loop which includes also electronic tracking circuits, and in which a loop frequency offset is varied in steps in accordance with the measured amount of Doppler shift.

Another object is to provide a Doppler laser gauge in which the range of measurement is enlarged by automatic range changing, and in which transition from one range to another is accomplished in ramp fashion.

DETAILED DESCRIPTION OF INVENTION

Figure 1:
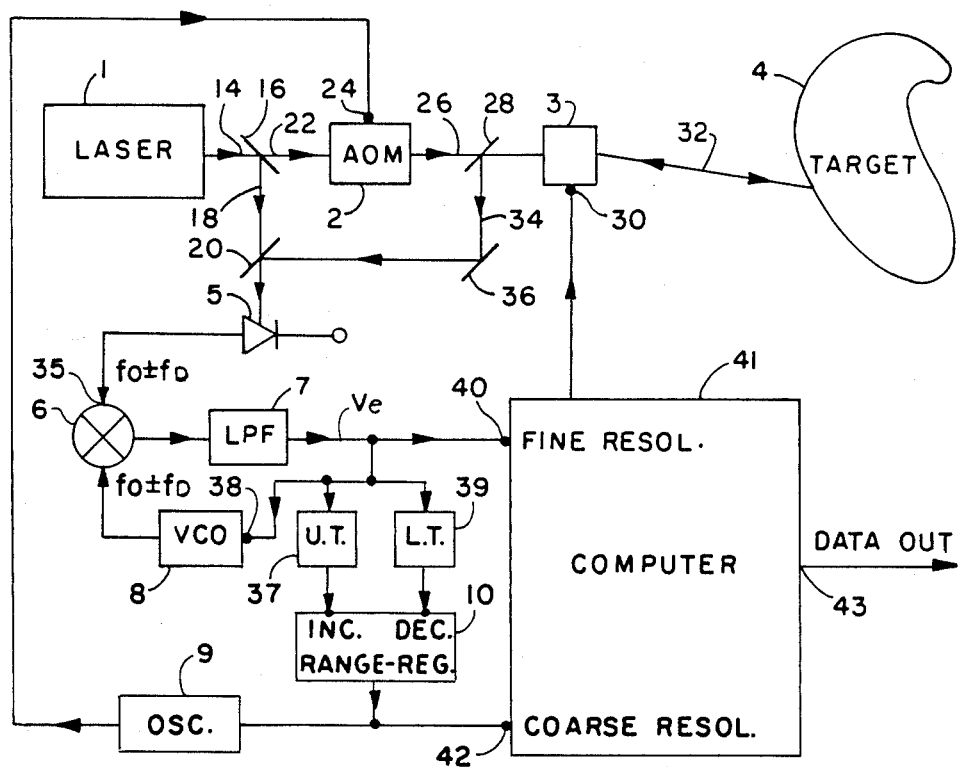
FIG. 1 is a simplified optical and electronic block diagram of a preferred embodiment of the invention.

Referring to FIG. 1, a helium-neon laser 1 emits a continuous wave laser beam 14 of a single frequency $f_1$, and the beam is divided by a beam splitter 16. A reference wave portion 18 is redirected by the beam splitter 16 to another beam splitter 20, through which it passes directly to a fast photodiode detector 5, which is commercially available.

A portion 22 of the original beam passes directly through the beam splitter 16 to an acoustooptical modulator 2. The modulator is a Bragg cell that modulates the received laser beam in accordance with a modulating signal voltage at its terminal 24. The laser's frequency is offset in the modulator 2 by an amount $f_o$ from the original frequency $f_1$. From the output of the modulator 2, a beam 26 strikes a beam splitter 28, through which it passes directly to a scanner 3. At control terminals 30 of the scanner 3, electrical signals control, in two axes, the direction of a path 32 along which the output beam travels from scanner 3 toward the target 4. A computer 41 provides the necessary scan-controlling signals in accordance with a stored program.

Illumination of a spot on the target 4 by the laser beam produces reflection or backscattering of some light energy toward the scanner 3. If the distance to the reflection spot is changing, reflection by the target alters the frequency of the wave by an upward or downward Doppler shift of an amount $f_D$. Another reflection of the return target wave occurs at the beam splitter 28. A reflected beam 34 from splitter 28 is reflected again from a mirror 36 to the beam splitter 20, where it is redirected toward the photodiode detector 5.

The reference beam, of frequency $f_1$, and a target return beam are recombined at the beam splitter 20, and they impinge together on the detector 5, which produces an electrical output signal. The electrical signal's component of interest at the photodiode 5 has the frequency $f_o$ due to the acoustooptical cell 2, plus or minus any Doppler shift $f_D$ imposed by rate of change of the radial distance from the gauge to the reflection spot on the target 4. That signal is input at terminal 35 to a phase locked loop comprising a phase comparator (mixer) 6, a lowpass filter 7, and a voltage controlled oscillator (VCO) 8. The VCO 8 locks onto that signal's frequency and tracks it.

While the loop is locked on and tracking the signal at terminal 35, a phase error signal comes from the output of the comparator 6. It is filtered by the filter 7 to eliminate extraneous higher-frequency components. The filtered error signal voltage $V_e$ is connected to the input terminal 38 of the VCO 8; it controls the frequency at the output of VCO 8 so as to keep it equal to the frequency at terminal 35.

The error signal voltage $V_e$ is connected also to a "fine resolution" data terminal 40 of computer 41, to provide an indication of the difference of the frequency at terminal 35 from a free-running reference frequency established in advance for the phase locked loop. Analog to digital conversion apparatus is located in the computer block in this particular embodiment.

Figure 2:
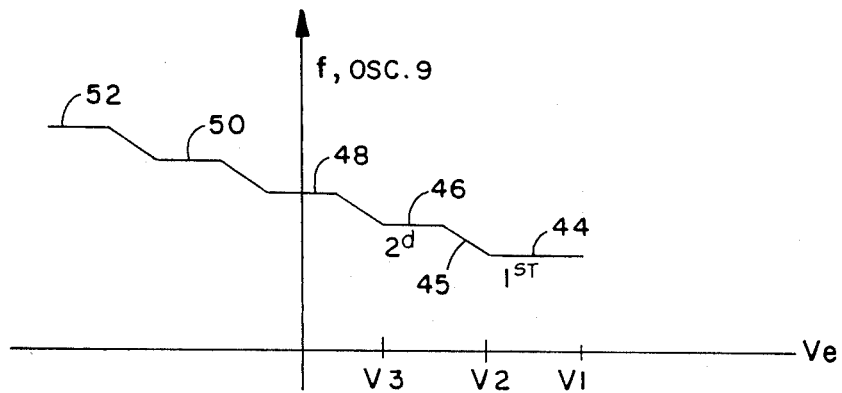
FIG. 2 is a graph of the output frequency of an ancillary oscillator (9) as a function of the filtered error signal of the phase locked loop, illustrating several operating regions.

If $f_o$ were zero and $f_D$ were to become very large, the phase locked loop (6, 7, 8), would pull out of lock. To prevent this the filtered phase error signal $V_e$ of the loop is connected also to an upper threshold comparator (UT) 37 and a lower threshold comparator (LT) 39. When $V_e$ exceeds a predetermined value, UT 37 transiently outputs a 1 (instead of its steady state zero) to increment a digital register 10, which stores the range number and controls the range, as shown in FIG. 2. In a similar way the comparator LT 39 decrements the range register 10 when $V_e$ gets too low. UT 37 and LT 39, by means of the range register 10, control the frequency of an oscillator 9, which is preferably a conventional digitally controlled frequency synthesizer of greater range capability than a VCO. The modulation input signal for terminal 24 of the acoustooptical modulator 2 is provided by the output of the ancillary oscillator 9.

While the phase locked loop is still within its hold-in range, if the error $V_e$ should become as high as a predetermined threshold amount, (i.e., a maximum acceptable limit), the drive frequency at terminal 24 of the acoustooptical cell would be "ramped" appropriately to the next level, as shown in FIG. 2. This change would make $f_o$ non-zero, and have the effect of reducing the "apparent" Doppler shift, so as to bring the frequency at terminal 35 of the phase locked loop within the hold-in capabilities of the loop.

When a large positive Doppler shift returns toward zero the offset steps of oscillator 9 are also reduced, causing the acoustooptical drive frequency to decrease. The signal at 42 indicates to the computer 41 the offset region in which the gauge is operating.

In this way the gauge dynamically changes its operating range in response to the magnitude of the the Doppler shift, to enable the phase locked loop 6, 7, 8 to track the Doppler shift over a wide dynamic range without pulling out of lock. Course and fine output data are provided at terminals 42 and 40 respectively. Their data are combined in the computer 41, with the course output generally providing the more significant digits' data and the fine data providing the less significant digits' data at a computer output bus 43.

Thus, the filtered error signal $V_e$ controls the oscillator 9 (by means of the components 37, 39 and 10), to cause it to produce one of a plurality of fixed frequency outputs, as shown at 44, 46, 48, 50 and 52 of FIG. 2. The oscillator 10 produces one predetermined output frequency when the $V_e$ is between predetermined limits $V_1$ and $V_2$, a second and different predetermined frequency when $V_e$ is between limits $V_2$ and $V_3$, etc. The system stratifies the signal $V_e$.

The optical loop is closed only in discrete steps. The frequency of the acoustooptical modulator 2 is controlled in steps, so as to offset in steps the frequency of the continuously variable target signals. The return signal frequency appears at terminal 35 of mixer 6, and its offset enables the phase locked loop to stay in lock throughout a larger dynamic range of actual Doppler shifts than would otherwise be possible with the loop.

In a slightly more refined embodiment the outputs of UT37 and LT 39 are connected directly to the computer 41; (the external block 10 is bypassed to terminal 42). Range register 10 is located inside the computer, and when UT 37 or LT 39 issues a change command pulse, the computer outputs a ramp digital output voltage. The offset frequency $f_o$ is changed gradually by the ramp as shown at 45 on FIG. 2. The ramp is not as wide as depicted on FIG. 2.

The refined embodiment would incorporate the acoustooptic modulator 2 in the reference path 18 between beam splitters 22 and 20. In terms of the signal processing, this change makes no difference but could lead to a more workable and easily implemented device.

What is claimed is:

1. A Doppler optical distance gauge comprising:
   laser means for providing a light beam;
   means for splitting the beam into a reference beam and a target beam;
   acoustooptical modulator means on the target beam intermediate the laser and a target, for offsetting the frequency of the target beam in response to a control signal;
   means for directing the target beam to the target and receiving a reflected return beam therefrom;
   frequency comparison means for comparing the return beam with the reference beam, and including frequency discriminator means;
   said frequency discriminator means being operable over at least a predetermined span of frequency variation, for measuring the frequency of the difference between the return beam and the reference beam and producing indicia of that difference;
   means responsive to said indicia for providing said control signal, to change the frequency of said target beam in a step change in a sense that maintains said measured frequency difference to an amount within said predetermined span of frequency variation; and
   means for combining said measured difference and said indicia to provide output data of Doppler shift;
   whereby automatic range changing occurs, to keep said measured frequency difference within said span.

2. A gauge as in claim 1 and wherein:
   said frequency discriminator means comprises phase locked loop means.

* * * * *